United States Patent Office 3,479,414
Patented Nov. 18, 1969

3,479,414
STABILIZED CHLORINATED HYDROCARBON
COMPOSITIONS AND PROCESS THEREFOR
André Ryckaert and Julien Mulders, Brussels, Belgium,
assignors to Solvay & Cie, Brussels, Belgium, a corporation of Belgium
No Drawing. Filed Oct. 19, 1967, Ser. No. 676,620
Claims priority, application Belgium, Oct. 28, 1966,
35,235, Patent 689,003
Int. Cl. C07c 17/42
U.S. Cl. 260—652.5                                      5 Claims

ABSTRACT OF THE DISCLOSURE

The stabilized chlorinated hydrocarbon compositions contain chlorinated hydrocarbon and a diaziridine compound, and are prepared by mixing chlorinated hydrocarbon with a diaziridine compound.

Background of the invention

The present invention concerns stabilized chlorinated hydrocarbon compositions and a process for the preparation thereof, wherein the decomposition and the simultaneous formation of acid during storage and use of the chlorinated hydrocarbon is prevented. In particular the present invention concerns stabilized trichloroethylene and tetrachloroethylene compositions.

It is well known that under the combined action of oxygen and heat, chlorinated hydrocarbons undergo catalytic oxidation in the presence of various agents such as light and specific metallic salts, for example the salts of iron, aluminum and magnesium (Kirk-Othmer, Encyclopedia of Chemical Technology, vol. 3 (1949), pp. 733–734).

It has already been proposed to slow down the oxidation of chlorinated hydrocarbons by the addition of small quantities of various substances, such as aliphatic alcohols, as suggested in British Patent No. 465,192 and in United States Patent No. 2,371,644, phenols as described in United States Patent No. 2,008,680, epoxy compounds, as stated in German Patent No. 695,316, inorganic basic compounds, as taught in United States Patent No. 2,096,735, organic bases, such as those listed in United States Patent Nos. 2,094,367, 2,096,735 and 2,370,552 and in French Patent No. 744,128, the N-alkyl pyrroles described in United States Patent No. 2,492,048, the triazines as in United States Patent No. 2,944,088, and some aziridine derivatives as taught in United States No. 2,878,297. A plurality of compounds known as chlorinated hydrocarbon stabilizers are given in Kirk-Othmer—Encyclopedia of Chemical Technology, 2nd edition, vol. 5 (1964), page 187, and in British Patent No. 765,522. However most of the known stabilizing agents suffer from some insufficiency.

Summary of the invention

The object of the present invention is the provision of chlorinated hydrocarbon compositions wherein the chlorinated hydrocarbon is exceedingly resistant to decomposition.

A further object of the invention is the provision of a method of stabilizing chlorinated hydrocarbon wherein the resultant chlorinated hydrocarbon is very resistant to decomposition. These and other objects will become apparent from the following description of the invention.

A new class of organic nitrogen compounds which may be used as chlorinated hydrocarbon stabilizers have been discovered.

It has been found that a remarkable stabilizing effect may be obtained by adding small quantity of diaziridine (diazacyclopropane) or an alkyl derivative thereof to chlorinated hydrocarbons. The new class of stabilizing agents may be represented by the following general formula:

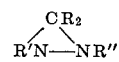

wherein R, R' and R" may be the same or different and are each hydrogen or a lower alkyl group, i.e. an alkyl group containing from 1 to 4 carbon atoms. The total of number of carbon atoms of the R, R' and R" radicals should be such that the boiling point of the proposed heterocyclic nitrogen compound is not too far away from the boiling point of the chlorinated hydrocarbon to be stabilized.

Chlorinated hydrocarbons which may be stabilized according to the invention include for example, carbon tetrachloride, dichloroethanes, trichloroethanes, trichloroethylene, tetrachloroethylene and the like, alone and in admixture.

Description of preferred embodiments

A diaziridine compound which may be used according to the invention is the 1,2-diethyl diaziridine of the formula:

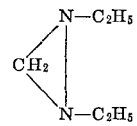

The amount of diaziridine used in the stabilized compositions of this invention is preferably between 0.025 and 0.5 g. per liter of chlorinated hydrocarbon.

Diaziridines are particularly useful for the stabilization of trichloroethylene and tetrachloroethylene.

The stabilizing action of diaziridine compounds on trichloroethylene has been established by two laboratory tests, one called the "global test," which has been developed by the applicant, the other being carried out in conformity with United States Federal Specification No. O-T-634a-II.

The "global test" may be carried out as follows:

One hundred and fifty cc. of trichloroethylene and a test piece of aluminum are placed in a 300 cc. balloon-flask of an apparatus of Soxhlet type provided with a 65 cc. extractor. The balloon-flask is electrically heated and trichloroethylene is rapidly brought to the boiling point under reflux conditions at a constant speed while a stream of oxygen is circulated therethrough. The apparatus is illuminated by means of a fluorescent lamp of the "Blue actinic" type. During the test, the speed of evolution of the acid vapors at the output of the apparatus is measured. This speed, which is very slow at the start, suddenly becomes very high while trichloroethylene turns black and is transformed into a black tarry mass. The resistance of trichloroethylene to the test is measured in hours, calculated from the start of the test, as soon as the sample is brought to the boiling point up to the point where the acid evolution suddenly becomes very fast and goes beyond $15.10^{-3}$ mol g./h. In order that the test be easily reproduced, it is necessary that the boiling speed be constant, as measured by the period between two successive siphonages of the liquid contained in the Soxhlet extractor. It is preferred to adopt a siphonage period of 60 minutes which is maintained constant at plus or minus 5 minutes by means of a careful regulation of the electric heating. The various samples of trichloroethylene which are used in the above test should be of the same composition and the aluminum test pieces should come from the same sheet. All the test pieces have been submitted to a treatment comprising shining with an emery paper, and washing with acetone, followed by drying.

The test according to the United States Federal Specification No. O-T-634a II is well known. In short, this test may be carried out as follows: The chlorinated hydrocarbon sample which is to be submitted to the test is put into an Erlenmeyer tube which is heated by an electric lamp and is provided with a condenser. A test piece made of SAE 1020 steel is suspended above the liquid in the vapor phase, and another test piece is put at the bottom of the apparatus in the liquid phase. Oxygen saturated with water is continuously introduced therein for a period of 48 hours. The introduction is carried out at a speed of 10 to 12 bubbles of oxygen per minute. At the end of the test, the acidity of the chlorinated hydrocarbon is determined by acidimetry in the presence of a colored indicator. In the tests carried out by the applicant, phenolphthaleine which has been suggested as the indicator in the Federal specification, has been replaced by bromocresol green which is not sensitive towards the acidity of carbonic gas. The acidity calculated as HCl is expressed in percent by weight of the chlorinated hydrocarbon.

The Table I below shows the results which have been obtained by utilizing these tests while adding 1,2-diethyl-diaziridine in the amounts indicated, to trichloroethylene.

TABLE 1

| Dose of 1,2 diethyl diaziridine, mg./l | 50 | 100 | 200 |
|---|---|---|---|
| Global test, duration of resistance, hrs | | 328 | >400 |
| Test of accelerated oxidation O-T-634a II, acidity percent HCl | 0.003 | [1]—0.0002 | [1]—0.0002 |

[1] The trichloroethylene is alkaline towards bromocresol green.

By way of comparison, the Table II hereinbelow indicates the results obtained with the "global test" using trichloroethylene which does not contain any stabilizers or which contains other organic nitrogen compounds, as stabilizers.

Table II

| Stabilizing compound, mg./1 | Resistance, hrs. |
|---|---|
| Nil | 22 |
| Aniline (200) | 22 |
| Pyrrole (100) | 84 |
| Pyrrole (200) | 164 |
| N-methylpyrrole (200) | 176 |
| N-ethylpyrrole (200) | 253 |
| (2-pyrryl) trimethylsilane (200) | 89 |

Tests were also carried out to determine the stability of tetrachloroethylene. A "global test" which has been modified was carried out as follows:

One hundred and fifty cc. of tetrachloroethylene and a steel test piece (50 x 10 x 1.2 mm.) having a low content of carbon were placed in a 300 cc. balloon-flask of a Soxhlet apparatus provided with a 65 cc. extractor. A second test piece made of the same steel (50 x 10 x 1.2 mm.) is put into the extractor. The balloon is electrically heated and tetrachloroethylene is rapidly brought to a boil under reflux at a constant speed while a light stream of oxygen is circulated through the apparatus which is illuminated by means of a fluorescent lamp of the daylight type. Heating is regulated so that the extractor is emptied at every 60 minutes. After 48 hours, the test was stopped. The acidity was determined in the aqueous extract obtained by agitating one volume of tetrachloroethylene with one volume of demineralized water. The acidity is expressed in milliequivalents of HCl by liter of tetrachloroethylene.

Table III shows the results obtained and, by way of comparison, gives the figures pertinent to other known stabilizers.

Table III

| Stabilizing compound, mg./l. | Acidity-milliequiv. HCl/l. |
|---|---|
| Nil | 970 |
| 1,2-diethyl diaziridine (100) | *—0.1 |
| α-picoline (100) | 100 |
| N-methylmorpholine (100) | 2.4 |
| Methoxypropionitrile (500) | 256 |
| Phenol (200) | 0.5 |
| Pyrrole (100) | *—0.08 |

The asterisks preceding the results concerning the use of 1,2-diethyl diaziridine and of pyrrole indicate that in these cases, tetrachloroethylene is slightly alkaline towards bromocresol green.

The chlorinated hydrocarbon compositions of this invention as well as the comparison compositions were prepared by thoroughly mixing the appropriate amount of stabilizer in milligrams per liter, as indicated in Table I, II and III with the specified chlorinated hydrocarbon.

The results of the tests set forth in Table I and II show the efficiency of the diaziridine derivative. The only stabilizer which gives results which may be compared to those of diaziridine is pyrrole, but it has been shown in Table II that this stabilizer is substantially inferior with respect to stabilizing trichloroethylene.

Diaziridine and its alkyl derivatives may be combined with other well known stabilizers. Various stabilizers of the diaziridine type may also be combined together.

The invention is not limited in any way to the above examples, with respect to the nature of the stabilizing agent and the amount utilized, and it is apparent that many changes may be made in practicing this invention without departing from the spirit thereof.

What we claim and desire to secure by Letters Patent are:

1. Stabilized chlorinated hydrocarbon selected from a member of the group consisting of carbon tetrachloride, dichloroethanes, trichloroethanes, trichloroethylene, tetrachloroethylene and mixtures thereof containing a stabilizing amount of diaziridine, a lower alkyl derivative of diaziridene or mixtures thereof.

2. Stabilized chlorinated hydrocarbon according to claim 1 wherein said chlorinated hydrocarbon is trichloroethylene, tetrachloroethylene or mixtures thereof.

3. Stabilized chlorinated hydrocarbon according to claim 1 wherein said stabilizing amount is about 0.025 to 0.5 g. per liter of said chlorinated hydrocarbon.

4. Stabilized chlorinated hydrocarbon according to claim 3 wherein said chlorinated hydrocarbon is trichloroethylene, tetrachloroethylene or mixtures thereof.

5. Stabilized chlorinated hydrocarbon according to claim 1 in which said lower alkyl derivative of diaziridine is a 1,2-di(lower alkyl)diaziridine.

References Cited

UNITED STATES PATENTS 2,043,257   6/1936   Missbach _____ 260—652.5

FOREIGN PATENTS 893,388   4/1962   Great Britain.

LEON ZITVER, Primary Examiner

MATTHEW M. JACOB, Assistant Examiner

U.S. Cl. X.R.

23—253; 252—153